(12) United States Patent
Wild et al.

(10) Patent No.: US 8,337,074 B2
(45) Date of Patent: Dec. 25, 2012

(54) STIRRER UNIT

(75) Inventors: Hansueli Wild, Jona (CH); Marcel Trueb, Winterthur (CH); Beat Signer, Volketswil (CH)

(73) Assignee: Mettler-Toledo AG, Greifensee (CH)

( * ) Notice: Subject to any disclaimer, the term of this patent is extended or adjusted under 35 U.S.C. 154(b) by 659 days.

(21) Appl. No.: 12/240,052

(22) Filed: Sep. 29, 2008

(65) Prior Publication Data

US 2009/0116335 A1 May 7, 2009

(30) Foreign Application Priority Data

Nov. 1, 2007 (EP) .................................... 07119828

(51) Int. Cl.
*B01F 7/00* (2006.01)
(52) U.S. Cl. ................... 366/249; 366/284; 366/326.1; 366/331
(58) Field of Classification Search .................. 366/282, 366/284, 286, 326.1, 331, 242–252
See application file for complete search history.

(56) References Cited

U.S. PATENT DOCUMENTS

| | | | | |
|---|---|---|---|---|
| 1,447,653 A | * | 3/1923 | Fish | 366/247 |
| 2,191,739 A | * | 2/1940 | Bean | 366/286 |
| 3,622,129 A | * | 11/1971 | Mazowski | 366/247 |
| 3,656,974 A | * | 4/1972 | Mihalyi et al. | 99/348 |
| 4,190,371 A | * | 2/1980 | Durr et al. | 366/139 |
| 4,225,247 A | * | 9/1980 | Hodson | 366/40 |
| 4,400,881 A | | 8/1983 | Boudin et al. | |
| 4,422,770 A | * | 12/1983 | Geible | 366/248 |
| 4,512,666 A | * | 4/1985 | O'Connell | 366/249 |
| 4,755,060 A | * | 7/1988 | Pedersen | 366/286 |
| 4,828,395 A | | 5/1989 | Saito et al. | |
| 4,832,501 A | * | 5/1989 | McCauley | 366/279 |
| 5,251,979 A | * | 10/1993 | Larsen | 366/248 |
| 5,653,536 A | | 8/1997 | Mandel | |
| 5,836,687 A | * | 11/1998 | Khalid | 366/207 |
| 6,076,958 A | * | 6/2000 | Althouse et al. | 366/286 |
| 6,113,258 A | | 9/2000 | Ardent | |
| 6,341,887 B1 | * | 1/2002 | Hansen, Sr. | 366/138 |
| 2005/0238540 A1 | * | 10/2005 | Swon et al. | 422/99 |
| 2006/0280028 A1 | * | 12/2006 | West et al. | 366/331 |
| 2011/0235463 A1 | * | 9/2011 | Justusson et al. | 366/247 |
| 2012/0017778 A1 | * | 1/2012 | Elissen | 99/453 |
| 2012/0147696 A1 | * | 6/2012 | Swader | 366/249 |

FOREIGN PATENT DOCUMENTS

| | | |
|---|---|---|
| DE | 2700818 | 7/1978 |
| DE | 29713578 | 9/1997 |
| JP | 59162934 | 9/1984 |

OTHER PUBLICATIONS

Brief translation of European Search Report, Application No. EP 07 11 9828, dated Apr. 2, 2008.

* cited by examiner

*Primary Examiner* — Joseph Del Sole
*Assistant Examiner* — Nahida Sultana
(74) *Attorney, Agent, or Firm* — Leydig, Voit & Mayer, Ltd.

(57) ABSTRACT

A stirrer unit includes a reaction vessel having an inlet port, a shaft stirrer having a stirrer blade and a stirrer shaft connected to the stirrer blade, and an adapter defining a passage. The adapter is configured to be inserted into the inlet port and releasably fastened to the inlet port using a fastening device so that, in a connected state, the stirrer blade and a part of the stirrer shaft is disposed inside the reaction vessel. Furthermore, in the connected state, an immersion depth to which the stirrer shaft extends into the reaction vessel is adjustable and securable using a locking device in at least two positions that are spaced apart from one another.

11 Claims, 4 Drawing Sheets

STIRRER UNIT

Priority is claimed to European Patent Application No. EP 07119828.7, filed on Nov. 1, 2007, the entire disclosure of which is incorporated by reference herein.

The present invention relates to a stirrer unit with a reaction vessel and a height-adjustable shaft stirrer.

BACKGROUND

In many areas of chemistry, biochemistry, pharmacology and biology, shaft stirrers are used for the mixing of a reaction medium in a reaction vessel. The stirring is required for example in chemical and/or physical reactions with several phases, when a reaction component is being added, or if components in solid form are present. In heterogeneous reaction media, the stirring has the function of mixing the components thoroughly with each other. In homogeneous reaction media, stirring is often necessary in order to distribute an added substance quickly and thoroughly in the solution, in order to avoid high local concentrations, local overheating, or boiling delays. If a reaction is to be stirred over a longer time period or inside an enclosed reaction vessel, one can use for example a magnetic stirrer or a CPG (core-drawn precision glass) stirrer.

A magnetic stirrer consists of a coated iron element which is inserted into the reaction medium and a drive source which is located outside of the reaction vessel. The known state of the art includes iron elements with diverse shapes, with the shape and length of the iron element being selected to match the dimensions of the reaction vessel and the nature and viscosity of the reaction medium. These stirrers suffer from the drawback that the iron element is difficult to remove from the reaction vessel especially in complex laboratory setups and further that a magnetic stirrer cannot be used for reaction media of intermediate or high viscosity.

A CPG stirrer often consists of a stirrer shaft of glass, where one end of the shaft is configured as, or connected to, a stirrer blade, and the other end of the shaft is connected to an electric motor by way of a coupling. In laboratory applications, one uses for example simply a piece of vacuum hose for the coupling. CPG stirrers can also be used for the mixing of reaction media with higher viscosities. However, because of the electric motor, they characteristically require a large amount of space and can be used effectively only above a certain filling height of the reaction vessel. Furthermore, the reaction vessel as well as the electric motor need to be secured to a suitable post, and stirrer shafts made of glass can be used only in a laboratory environment, because due to the danger of breakage which is inherent in this material they should be continuously monitored.

Further developed versions therefore often have stirrer shafts that are made of other materials such as different metals, ceramics or polymers and are driven by a motor through a suitable coupling.

Shaft stirrers, which in the broadest sense also include the aforementioned CPG stirrers, have the advantage that they can be more easily removed from the reaction medium and that they are also capable of mixing highly viscose reaction media.

The mixing of the reaction medium is influenced on the one hand by the selection of the stirrer blade, the power of the motor, and the selected rate of rotation, but on the other hand also by the orientation of the stirrer blade in the reaction vessel. It has thus been found that if the volume of the reaction medium increases or if the fill level rises, for example if further reagents are added, the position of the stirrer blade should also be readjusted in order to ensure that the rate of mixing remains the same. A position readjustment of the stirrer blade in this context means not only a change of the distance between an inlet port on the reaction vessel and the stirrer blade which is arranged in the reaction vessel, but also a change of the immersion depth of the stirrer shaft into the reaction vessel.

The stirrer is normally fastened to the inlet port by means of a suitable adapter, and both the reaction vessel and the motor are secured on a support stand or a similar device. To provide the capability for adjusting the height of the stirrer blade, it is possible to use for example stirrer shafts of different lengths, and/or extension pieces. This has the disadvantage that, in order to adjust the position of the stirrer blade, it is necessary to either remove the entire stirrer from the reaction vessel, to disassemble and reassemble the stirrer, or to remove at least parts of the setup or of the stirrer.

SUMMARY OF THE INVENTION

It would be desirable if the immersion depth of the stirrer shaft could be adjusted in a simple, fast and reproducible manner, so as to keep interruptions of the stirring process as short as possible. The reaction medium should remain constantly in motion in order to suppress for example the occurrence of locally concentrated overheating or undesirable side reactions. Furthermore, some of the reaction medium could be removed from the reaction vessel in the course of uninstalling the stirrer, which can lead to a change in the relative proportions of the reagents and can in the final outcome affect the yield and/or the reaction products.

It is an object of the invention to develop a shaft stirrer wherein the immersion depth of the stirrer into a reaction vessel can be changed in a simple and fast manner without having to remove the stirrer from the reaction vessel.

The present invention provides a stirrer unit with a reaction vessel that has an inlet port and with a shaft stirrer. The shaft stirrer has a stirrer blade, a stirrer shaft fastened to the stirrer blade, and an adapter with a passage in which the stirrer shaft is guided. The adapter can be inserted with a precise fit into the inlet port and can be releasably fastened on the inlet port through a fastening means, so that the stirrer blade and a portion of the stirrer shaft are disposed inside the reaction vessel. The stirrer unit according to the present invention is distinguished in that the immersion depth of the stirrer shaft into the reaction vessel is adjustable and can be secured with a locking device in at least two positions that are spaced apart from each other, while the adapter remains connected to the inlet port.

An advantage of the stirrer according to the present invention is that it allows the immersion depth to be changed without disassembling and/or partially dismantling the stirrer unit, and to secure the immersion depth reproducibly in at least two position settings.

The stirrer shaft is held in a guide sleeve which is position-adjustable relative to the adapter. By moving the guide sleeve relative to the adapter along the lengthwise axis of the shaft stirrer, the stirrer shaft is pulled out of, or pushed into, the reaction vessel by a certain distance, so that the immersion depth can be changed in this manner.

The distance between the adapter and the guide sleeve can be changed for example by twisting, in conjunction with a simultaneous movement of the guide sleeve along the lengthwise axis of the shaft stirrer, which allows a continuous adjustment of the immersion depth.

This can be achieved in particular through a design where the adapter and the guide sleeve are provided with adjustment screw threads that cooperate with each other. The adapter is equipped with an external screw thread that is capable of engaging an internal screw thread of the guide sleeve. This allows a stepless adjustment of the immersion depth.

For the fixation of the desired immersion depth, the guide sleeve can be secured on the adapter by means of the locking device. In a continuously adjustable guide sleeve, the locking device can be configured for example in the form of screws, springs or similar elements which secure the guide sleeve on the adapter.

In a preferred embodiment the locking device takes the form of a locking lever which is arranged on the guide sleeve and which cooperates with at least two recesses that are arranged apart from each other on the outside of the adapter. The locking lever can have one end configured so that it can engage and/or snap into the recesses. The locked position can be secured by an elastic element which in the case of the locking lever pushes one end of the locking lever into one of the recesses and thereby secures the end of the lever in the recess.

The design of the locking element as a locking lever has the advantage that a lever is simple to operate and in particular capable of being operated with one hand, and that it can be tilted about a fulcrum. The elastic element can set the locking lever back again into its original position.

In a further embodiment, the locking device can be configured as a counter nut. The locking device can further be configured as a screw, in particular as a grub screw. These two embodiments of the locking device are advantageous in particular in combination with the adjustment screw threads.

The counter nut can easily be loosened manually, whereupon the immersion depth can be changed and then secured again by manually tightening the counter nut.

A locking device in the form of a screw can for example protrude on the outside from the guide sleeve, for simple manual loosening and tightening. As an alternative, it is also possible to use a grub screw which can be loosened or tightened with a suitable utensil.

One end of the stirrer shaft is connected to the stirrer blade or configured as a stirrer blade, and the other end can be connected to a first coupling element or can be configured as a coupling element.

As a drive source, the stirrer unit can have a motor and, connected to the latter, a motor shaft whose free end is connected to a second coupling element or is configured as a second coupling element. The second coupling element can be coupled to the first coupling element, so that for example a torque generated by the motor can be transmitted to the stirrer shaft.

The coupling elements should have the distinguishing trait that the coupling can be released or connected rapidly and without using any utensils, with the configuration of the coupling elements not being limited to a specific form, but encompassing any state-of-the-art elements which can provide a coupling connection.

It is advantageous if the motor can be connected to the guide sleeve in a releasable manner, so that the motor can be separated in a simple way, preferably manually and/or without using tools or other auxiliary means, and the stirrer unit can for example be put in another place in the laboratory and/or can be cooled. In order to accomplish this, the motor can be connected to the guide sleeve for example by means of a motor flange.

Preferred is a clamping connection between the motor and the guide sleeve wherein, when the reaction vessel, the adapter and the guide sleeve have a fixed connection, said clamping connection can be released with one hand without thereby changing the immersion depth of the stirrer shaft. Thus, the motor and the stirrer shaft can be released from each other without causing a change of the immersion depth.

Further embodiments can have a snap connection, a detent connection, or a bayonet connection between the motor and the guide sleeve.

BRIEF DESCRIPTION OF THE DRAWINGS

A stirrer unit according to the invention is described with the help of the following drawing figures wherein identical elements are identified with the same reference symbols, and wherein.

DETAILED DESCRIPTION

Figure 1:
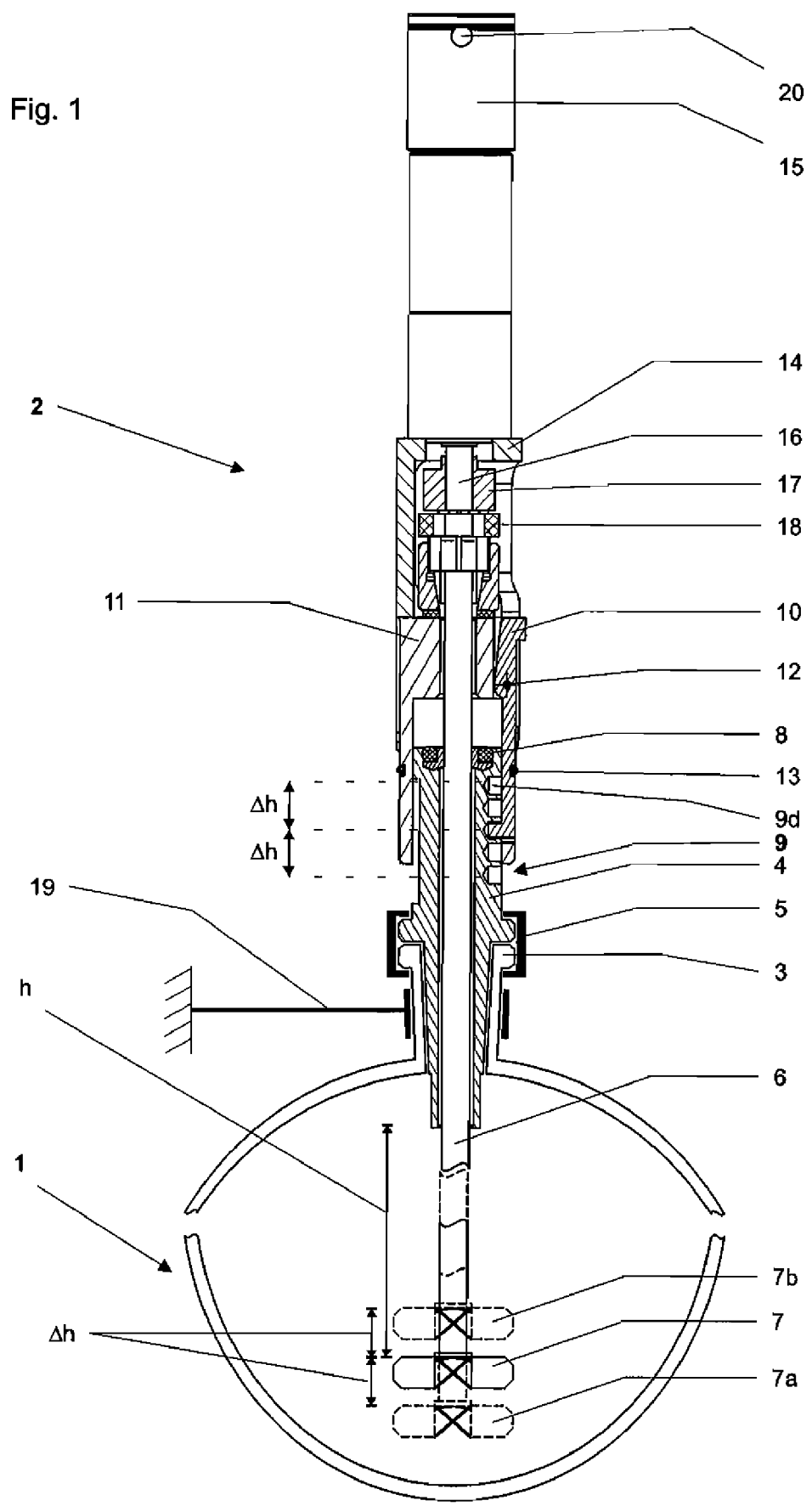
FIG. 1 represents a stirrer unit with a reaction vessel and a shaft stirrer shown in a sectional view.

FIG. 1 shows a stirrer unit with a reaction vessel 1 and a shaft stirrer 2. The reaction vessel 1 has an inlet port 3 in which an adapter 4 of the shaft stirrer 2 is inserted with a precise fit. The adapter 4 is releasable connected to the inlet port 3 by means of a suitable fastening means 5, for example a clamp as shown here. The adapter 4 is configured in such a way that it fills out the inlet port 3 and thus closes off the reaction vessel 1.

The adapter 4 has a central passage in which a stirrer shaft 6 is mounted. The stirrer shaft 6 is connected to a stirrer blade 7 which is located in the reaction vessel 1. The size of the stirrer blade 7 can be adapted to the diameter of the reaction vessel 1. In order to move the shaft stirrer more easily out of and into the reaction vessel 1, the stirrer blade 7 can be of a foldable or flexible configuration so that it fits through the inlet port 3. The end of the adapter 4 that faces away from the reaction vessel 1 is sealed by a sealing means 8 towards the stirrer shaft 6. On the outside of the adapter 4 there are further a plurality of recesses 9 which can be engaged by a lever-like locking device 10. The locking device 10 is arranged on a guide sleeve 11 which is movable relative to the adapter 4 along the lengthwise axis of the shaft stirrer. The locking device 10 has a fulcrum 12 about which the lever-like locking device can be pivoted.

When the locking device 10 is in a released state, the guide sleeve 11 can be moved along the lengthwise axis of the shaft stirrer and can be secured at several different distances from the adapter 4 which are defined by the recesses 9. The adapter 4 and the guide sleeve 11 consist of a smooth material in order to allow a movement that is substantially free of friction, and in addition the material used for the adapter 4 has to be chemically inert. PTFE (polytetra-fluoroethylene), for example, lends itself to manufacture of these elements.

By releasing the locking device 10, moving the guide sleeve 11, and letting the locking device 10 reengage another recess 9, it is possible to change the immersion depth h of the stirrer blade 7 in the reaction vessel 1.

In FIG. 1, the locking device 10 is engaged in the middle one of the recesses 9. Starting from this position, the immersion depth h could be changed by Δh along the lengthwise axis of the shaft stirrer 2, as indicated by the stirrer blades 7a and 7b which are drawn in broken lines.

For the engagement of the locking device 10, the latter is held in resilient contact with the guide sleeve 11 by means of an elastic element 13 which is arranged in a groove of the guide sleeve 11. If pressure is applied to what is drawn in FIG. 1 as the upper and wider part of the locking device 10, this will cause the locking device to be pushed out of one of the recesses 9. When the pressure is taken off, the locking device will be pushed against the guide sleeve 11 again by the elastic element 13 and will seat itself either in another or the same recess 9, depending on the desired immersion depth h.

The guide sleeve 11 is further releasably connected to the housing of a motor 15 by way of a motor flange 14. The motor 15 has a motor shaft 16 which is connected at its free end to a second coupling element 17. The motor 15 further has a connector 20 for a power- and/or data cable. The second coupling element 17 engages a first coupling element 18 which is connected to the stirrer shaft 6.

The motor 15 can transmit a torque to the stirrer shaft 6 by way of the motor shaft 16 and the coupling elements 17, 18. If the reaction vessel 1 is secured on a stand 19 or in any other suitable manner, then the reaction to the torque generated by the motor 15 can be transmitted to the reaction vessel 1 and/or to the holder stand 19 by way of the fastening means 5. This makes an additional fixation of the shaft stirrer 2, for example an attachment of the motor 15, unnecessary, and it is possible to change the immersion depth h of the stirrer blade 7 in the reaction vessel with one hand.

Besides the illustrated securing arrangement for the reaction vessel 1 on the holder stand 19, the reaction vessel 2 can for example also be a part of an analytical instrument and can be fastened in or attached to the latter.

Figure 2:
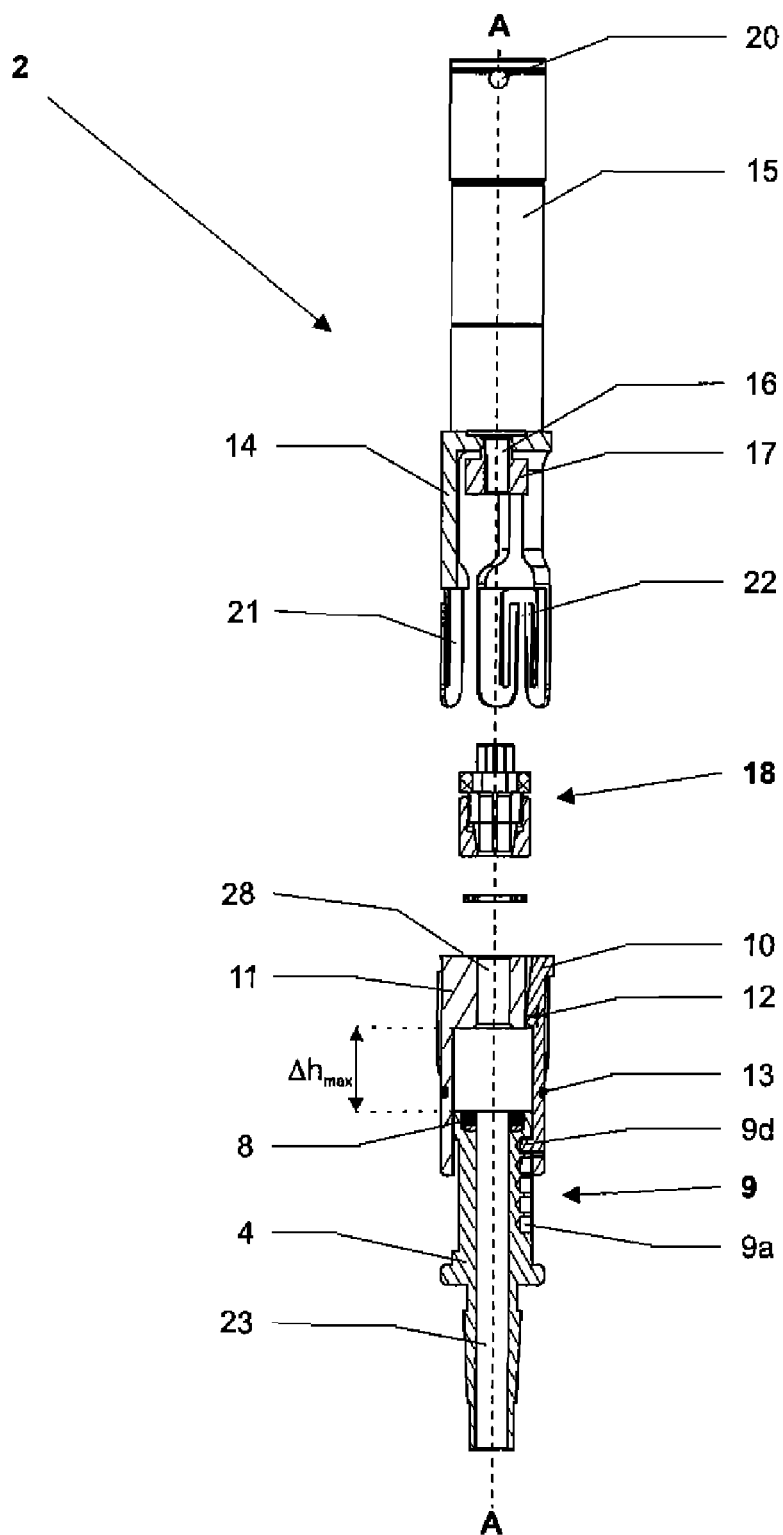
FIG. 2 represents the shaft stirrer of FIG. 1 in the disassembled state without stirrer shaft and stirrer blade, shown in a sectional view.

FIG. 2 illustrates in sectional view the shaft stirrer 2 in the uninstalled state. The motor 15 together with the motor flange 14, the motor shaft 16 and the second coupling element 17 can be separated from the guide sleeve 11 by a simple pulling movement, as the motor flange 14 is connected to the guide sleeve 11 through a spring-clamp connection. The spring-clamp connection is formed by the partially elastic, fork-like extensions or clamping springs 21 of the motor flange which on the one hand embrace the guide sleeve 11 and on the other hand, with their cutout openings 22, enter into engagement with seating guides that are arranged on the outside of the guide sleeve (see FIG. 3).

Besides the motor 15, the first coupling element 18 can also be removed from the stirrer shaft (not shown here).

The guide sleeve 11 and the adapter 4 are shown in FIG. 2 at the limit of their mutual position-adjustment range and have a distance $\Delta h_{max}$ from each other which is defined by the distance of the recesses 9a and 9d from each other. This maximum distance $\Delta h_{max}$ represents the maximum amount by which the stirrer blade and/or the stirrer shaft can be moved in the reaction vessel and thus the maximum change of the immersion depth (see FIG. 1).

The stirrer shaft with the stirrer blade that is attached to it is not shown here (see FIG. 1). The stirrer shaft can be held in the passages 23, 28 in the adapter 4 and in the guide sleeve 11, respectively.

Figure 3:
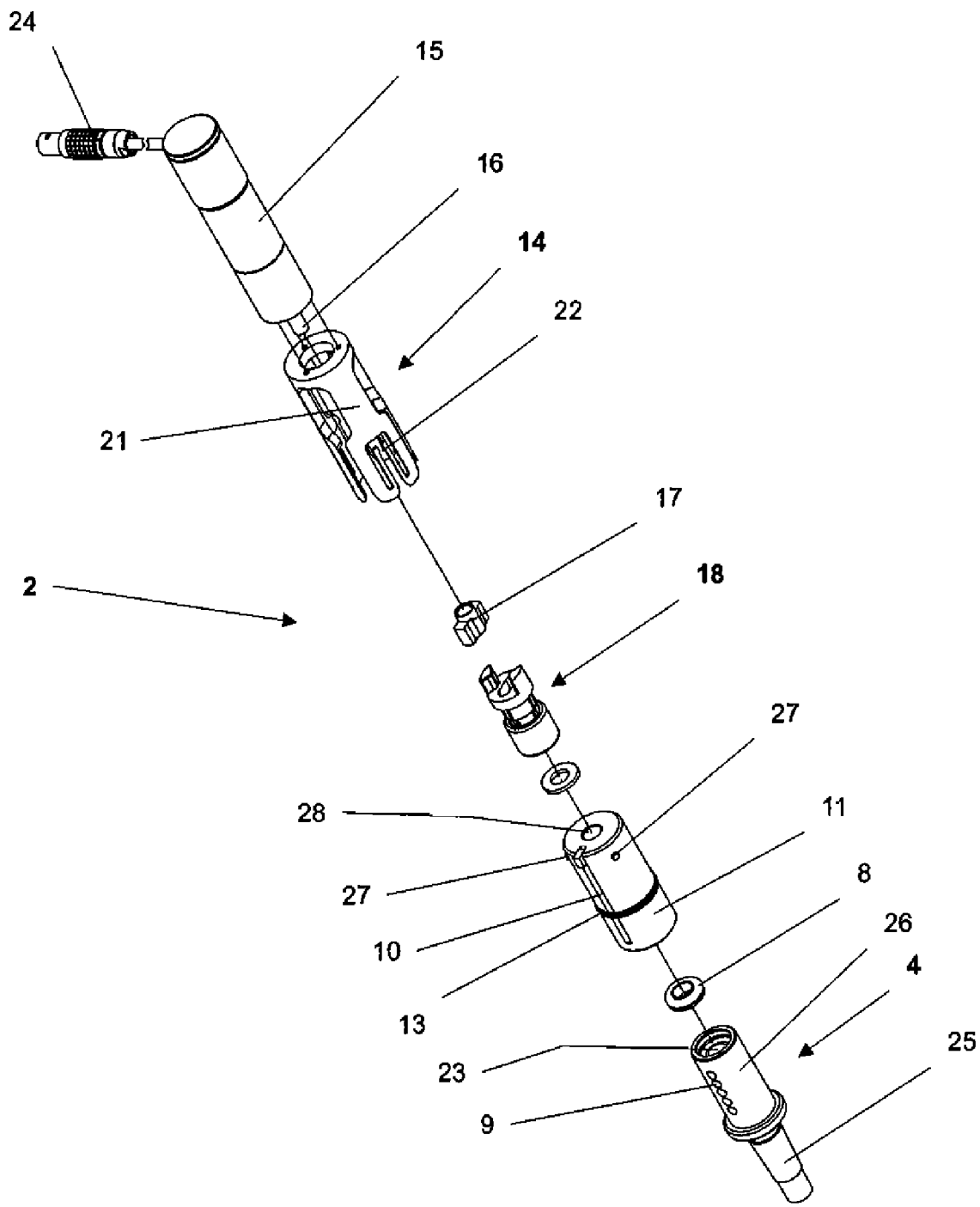
FIG. 3 shows the shaft stirrer of FIG. 2 in a three-dimensional exploded representation.

FIG. 3 illustrates the shaft stirrer 2 in a three-dimensional exploded view. In addition to the elements shown already in FIGS. 1 and 2, this drawing shows a power- and/or data cable 24 which can be connected to the motor 15, as well as the seating guides 27 which are arranged on the outside of the guide sleeve 11 and each of which in the installed state engages a cutout 22 of one of the fork-shaped extension 21 of the motor flange 14.

One can further see the adapter 4 which is made of one piece and consists of a connector portion 25 for the connection to the reaction vessel, and of an adjustor sleeve 26. Arranged on the outside of the adjustor sleeve 26 are several recesses 9 which can cooperate with the locking device 10.

The coupling elements 17, 18 in the installed condition are engaged in each other. Dependent on the material of the stirrer shaft being used, it is possible to use different first coupling elements such as for example clamp couplings, clamp plugs, screw-treaded connections and other solutions which are well known to any professional in this field.

Figure 4:
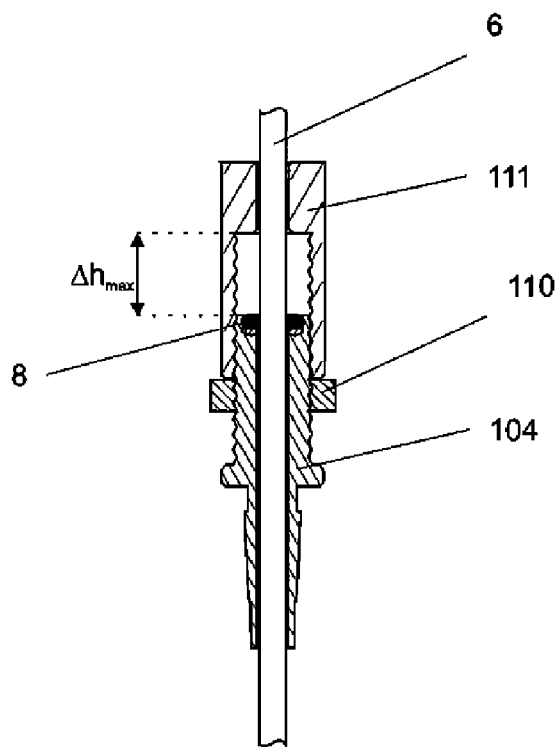
FIG. 4 represents a further embodiment of the guide sleeve, the adapter and the locking device, shown in a sectional view.

FIG. 4 shows a further design of an adapter 104 and a guide sleeve 111. The adapter 104 has an external screw thread which cooperates with an internal screw thread of the guide sleeve 111. The screw threads form a screw-adjustment device which allows the guide sleeve 111 to be moved relative to the adapter 104 along the lengthwise axis of the shaft stirrer. The stirrer shaft 6 is constrained in the adapter 104 and in the guide sleeve 111. As a locking device 110, this design has a counter nut 110 which is arranged on the adapter 104.

Figure 5:
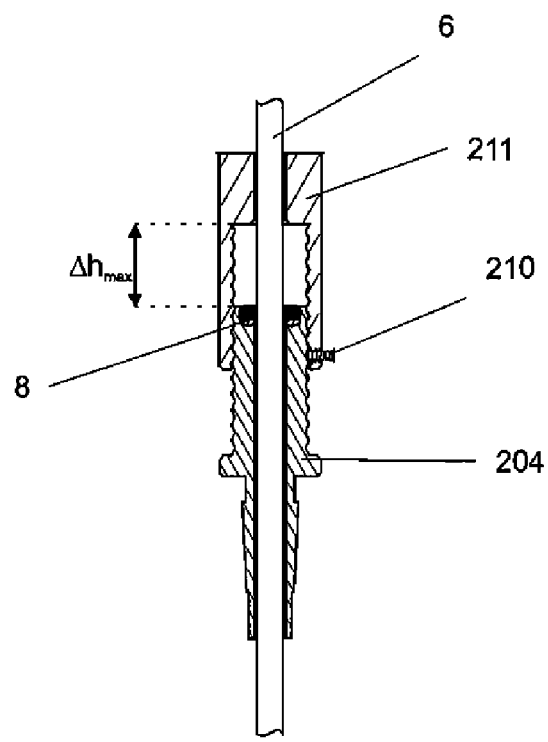
FIG. 5 illustrates a further embodiment of the guide sleeve, the adapter and the locking device, shown in a sectional view.

The example of an embodiment which is shown in FIG. 5 has a guide sleeve 211 with an internal screw thread and an adapter 204 with an external screw thread, wherein the screw threads cooperate so as to allow a movement of the guide sleeve 211 relative to the adapter 204 along the lengthwise axis of the shaft stirrer 2. The function of a locking device 210 is performed by a screw, for example a grub screw or a thumb wheel screw, whereby the guide sleeve 211 is locked in position on the adapter 204 when the screw is turned into the guide sleeve 211 and tightened against the adapter 104.

| LIST OF REFERENCE SYMBOLS | |
|---|---|
| 1 | reaction vessel |
| 2 | shaft stirrer |
| 3 | inlet port |
| 4, 104, 204 | adapter |
| 5 | fastening means |
| 6 | stirrer shaft |
| 7, 7a, 7b | stirrer blade |
| 8 | sealing means |
| 9, 9a, 9d | recesses |
| 10, 110, 210 | locking device |
| 11, 111, 211 | guide sleeve |
| 12 | fulcrum |
| 13 | elastic element |
| 14 | motor flange |
| 15 | motor |
| 16 | motor shaft |
| 17 | second coupling element |
| 18 | first coupling element |
| 19 | support stand/stand |
| 20 | connector |
| 21 | fork-shaped extensions/clamping springs |
| 22 | cutout opening |
| 23 | passage in 4 |
| 24 | power- or data cable |
| 25 | connector portion |
| 26 | adjustor sleeve |
| 27 | seating guide |
| 28 | passage in 11 |

What is claimed is:
1. A stirrer unit comprising:
a reaction vessel having an inlet port; and
a shaft stirrer including:
a stirrer blade, a stirrer shaft connected to the stirrer blade;
an adapter having a passage, wherein the adapter is configured to be inserted so as to fit into the inlet port and releasably fastened to the inlet port using a fastening device so that, in a connected state, the stirrer blade and a part of the stirrer shaft is disposed inside the reaction vessel, and wherein, in the connected state, an immersion depth to which the stirrer shaft extends into the reaction vessel is adjustable by adjusting an axial position of the stirrer shaft relative to the adapter;
a locking device configured to secure the stirrer shaft in at least two axial positions relative to the adapter that correspond to different immersion depths that are spaced apart from one another; and
a spring element configured to secure the locking device in a fixed position.

2. A stirrer unit comprising:
a reaction vessel having an inlet port; and
a shaft stirrer including:
a stirrer blade;
a stirrer shaft connected to the stirrer blade;
an adapter having a passage, wherein the adapter is configured to be inserted so as to fit into the inlet port and releasably fastened to the inlet port using a fastening device so that, in a connected state, the stirrer blade and a part of the stirrer shaft is disposed inside the reaction vessel, and wherein, in the connected state, an immersion depth to which the stirrer shaft extends into the reaction vessel is adjustable;
a locking device configured to secure the stirrer shaft in at least two positions corresponding to different immersion depths that are spaced apart from one another; and
a guide sleeve circumferentially surrounding the stirrer shaft,
wherein the adapter is position-adjustable relative to the guide sleeve along a lengthwise axis of the shaft stirrer and, wherein a portion of the stirrer shaft at an opposite end from the stirrer blade is connected to a first coupling element.

3. The stirrer unit as recited in claim 2, wherein the guide sleeve is securable in a fixed position relative to the adapter using the locking device.

4. The stirrer unit as recited in claim 2, wherein the locking device includes a locking lever disposed on the guide sleeve.

5. The stirrer unit as recited in claim 2, further comprising a motor, a motor shaft connected to the motor, and a second coupling element connected to a free end of the motor shaft, wherein the second coupling element is configured to couple to the first coupling element.

6. The stirrer unit as recited in claim 5, further comprising a motor flange configured to releasably connect the motor to the guide sleeve.

7. The stirrer unit as recited in claim 2, wherein the adapter includes an external screw thread and the guide sleeve includes an internal screw thread cooperating with the external screw thread so that the immersion depth is adjustable in a stepless manner.

8. The stirrer unit as recited in claim 7, wherein the locking device includes at least one of a counter nut and a screw.

9. A stirrer unit comprising:
a reaction vessel having an inlet port; and
a shaft stirrer including:
a stirrer blade,
a stirrer shaft connected to the stirrer blade;
an adapter having a passage, wherein the adapter is configured to be inserted so as to fit into the inlet port and releasably fastened to the inlet port using a fastening device so that, in a connected state, the stirrer blade and a part of the stirrer shaft is disposed inside the reaction vessel, and wherein, in the connected state, an immersion depth to which the stirrer shaft extends into the reaction vessel is adjustable by adjusting an axial position of the stirrer shaft relative to the adapter; and
a locking device configured to secure the stirrer shaft in at least two axial positions relative to the adapter that correspond to different immersion depths that are spaced apart from one another,
wherein an outside of the adapter defines at least two recesses spaced apart from each other and cooperating with the locking device.

10. A stirrer unit comprising:
a reaction vessel having an inlet port; and
a shaft stirrer including:
a stirrer blade,
a stirrer shaft connected to the stirrer blade;
an adapter having a passage, wherein the adapter is configured to be inserted so as to fit into the inlet port and releasably fastened to the inlet port using a fastening device so that, in a connected state, the stirrer blade and a part of the stirrer shaft is disposed inside the reaction vessel, and wherein, in the connected state, an immersion depth to which the stirrer shaft extends into the reaction vessel is adjustable by adjusting an axial position of the stirrer shaft relative to the adapter;
a locking device configured to secure the stirrer shaft in at least two axial positions relative to the adapter that correspond to different immersion depths that are spaced apart from one another; and
a guide sleeve circumferentially surrounding the stirrer shaft, wherein the adapter includes an external screw thread and wherein the guide sleeve includes an internal screw thread cooperating with the external screw thread so as to provide continuous adjustment of the immersion depth.

11. The stirrer unit as recited in claim 10, wherein the locking device includes at least one of a counter nut and a screw.

* * * * *